July 11, 1950 S. C. CORONITI ET AL 2,514,847
APPARATUS FOR MEASURING THE WIDTH
OF FLEXIBLE STRIP MATERIAL
Filed July 8, 1944 6 Sheets-Sheet 1

INVENTORS
Samuel C Coroniti.
Willy A Schmidt.
Harold S Baldwin.
BY
Rodney C Southworth
Attorneys.

July 11, 1950  S. C. CORONITI ET AL  2,514,847
APPARATUS FOR MEASURING THE WIDTH
OF FLEXIBLE STRIP MATERIAL Filed July 8, 1944  6 Sheets-Sheet 2

INVENTORS.
Samuel C. Coroniti.
Willy A. Schmidt.
Harold S. Baldwin.

BY
Rodney C. Southworth
ATTORNEYS.

July 11, 1950  S. C. CORONITI ET AL  2,514,847
APPARATUS FOR MEASURING THE WIDTH
OF FLEXIBLE STRIP MATERIAL
Filed July 8, 1944  6 Sheets-Sheet 5

INVENTORS.
Samuel C. Coroniti.
Willy A. Schmidt.
Harold S. Baldwin.
BY
Rodney C. Southworth
ATTORNEYS.

July 11, 1950

S. C. CORONITI ET AL
APPARATUS FOR MEASURING THE WIDTH
OF FLEXIBLE STRIP MATERIAL 2,514,847

Filed July 8, 1944

INVENTORS.
Samuel C. Coroniti
Willy A. Schmidt
Harold S. Baldwin.

BY
Rodney C. Sautworth
ATTORNEYS.

Patented July 11, 1950

2,514,847

UNITED STATES PATENT OFFICE 2,514,847

APPARATUS FOR MEASURING THE WIDTH OF FLEXIBLE STRIP MATERIAL

Samuel C. Coroniti, Johnson City, N. Y., Willy A. Schmidt, Easton, Pa., and Harold S. Baldwin, Cliffside, N. J., assignors to General Aniline & Film Corporation, New York, N. Y., a corporation of Delaware Application July 8, 1944, Serial No. 544,106

6 Claims. (Cl. 33—143)

This invention pertains to instruments for measuring film or other material in strip form and is particularly applicable to making such measurements while the film or other strip material is being progressed through the instrument at a relatively rapid rate.

In the production of photographic film or other flexible strip material which is processed in relatively long lengths, measurement of width is important but relatively difficult. The permissible tolerances from given standards are so small that conventional measuring instruments can hardly serve. The fact that the film is relatively flexible and is usually very thin makes it impossible to employ instruments which require physical contact with the film or by which any appreciable force is exerted against the edges of the film.

Certain methods of measuring film width now employed, involve rather complicated optical or especially constructed mechanical measuring devices, and their use is not possible while the film is in motion. Thus, time consumed in measuring is considerable and it is not possible to measure a length of film except at predetermined spaced intervals. Therefore, it is especially desirable to obtain a record of the film width throughout its entire length while the film is progressed through the instrument at a rapid rate.

With these facts in mind a measuring instrument has been developed in accordance with this invention which gives a visual indication of width as the film is progressed at a relatively high speed, the instrument being very sensitive and capable of measuring accurately to limits finer than by either of the mechanical or optical measuring devices above mentioned. The mechanism of this instrument is adapted to use in routine production since it is very simple in its operation and is also relatively rugged in construction and stable in its electrical characteristics.

According to the operating principles of the invention, film is drawn between spaced elements which contact it at its lateral edges. At least one of these contact elements is moveable and each is connected to one terminal of an electrical condenser consisting of two opposed electrically separated plates. Relative movements between the contact elements in accordance with variations in film width give rise to proportionate variations in the air gap or dielectric between the two condenser plates. In this manner the effective capacity of the condenser is varied. This variation is caused to alter the resonance of a tuned circuit connected to a vacuum tube oscillator. A current indicating instrument in the vacuum tube circuit follows the changes in resonance and may be calibrated to indicate the current directly in terms of film width.

In a more detailed description to follow, two different forms which the invention may take are described, these being essentially the same in principle and illustrative of mechanical and electrical constructions which are conveniently employed. The invention is described by reference to the accompanying figures of drawing in which.

Figure 1:
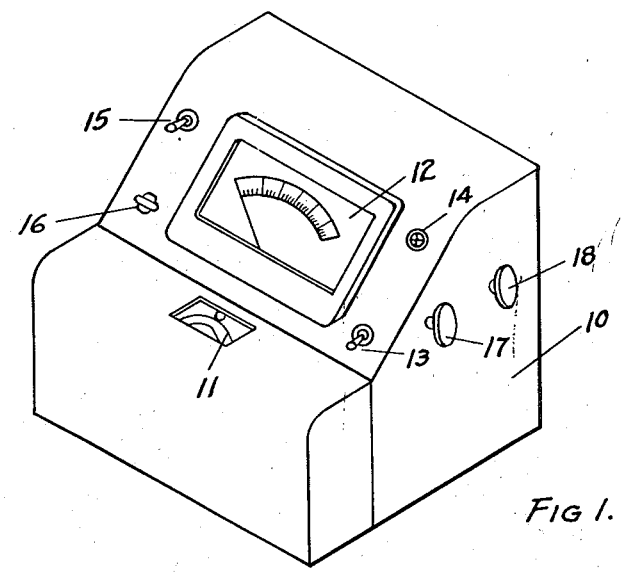
Fig. 1 is an isometric view of the instrument as it appears when encased and ready for use.

In Fig. 1 the complete instrument is shown as it appears to the operator. The mechanical and electrical components are enclosed within a casing 10 which has a window 11 through which the moving film can be observed and a second window 12 through which the indications of film width are seen. Various control elements include a switch 13 for controlling power to the circuit, a small light window 14 which indicates whether or not the power is turned on, a second switch 15 for tuning the oscillatory circuit and a speed control knob 16 by means of which the speed of the motor for taking up the film may be varied. The switch 15 is a toggle switch and is moved to one position for tuning the circuit and to the opposite position after the circuit has been warmed up and the instrument thoroughly prepared for actual operation. Of course power may be supplied from any convenient source, but it is contemplated that the instrument be operated from the usual 60 cycle 110 volt power line. The control knob 17 serves to vary the capacity of a condenser within the circuit, while the second knob 18 is for the purpose of varying resistance to the cathode of the oscillator tube.

The front portion of the casing is removeable as is also the cover over the electronic circuit, controls and take-up driving motor.

Figure 2:
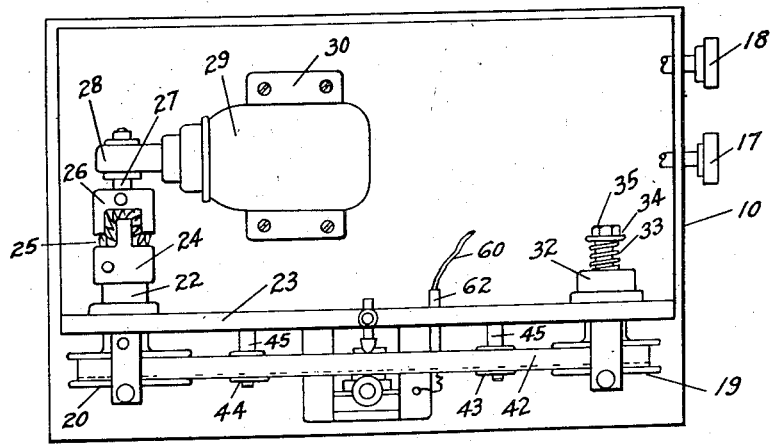
Fig. 2 is a plan illustrating certain mechanical parts of the measuring instrument.
Figure 3:
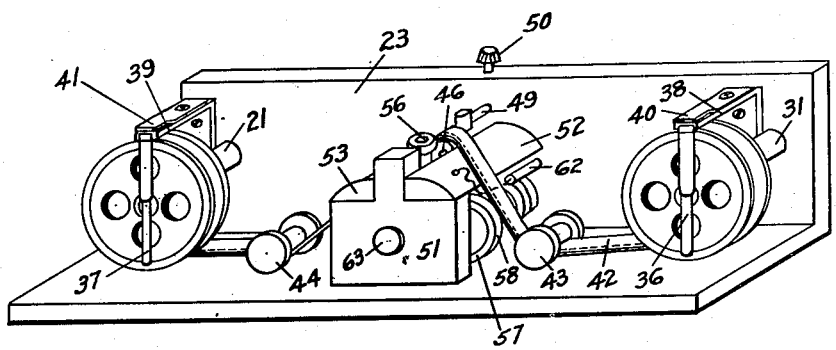
Fig. 3 is an isometric view of the portion of the instrument necessary for mounting the supply and take-up reels, guiding the film through the measuring contact elements, and the mechanical details of the means for accomplishing the measuring.

Now referring to Figs. 2 and 3, the film to be measured (previously wound on a reel or drum 19) is drawn off and wound on a second similar drum 20 by rotation by means of a spindle 21. The latter is keyed or otherwise provided with a driving means for engagement of the reel 20 and is also rotatable within a bearing 22 attached to, or projecting through, a bulkhead 23 running along the length of the instrument casing and generally dividing the front portion of the same from the back. The spindle 21 terminates in a clutch element 24 connected through flexible means 25, such as rubber, to a second part 26 of the clutch. This part of the clutch is fixed to a projecting shaft 27 extending from a gear casing 28 which is an integral part of the motor 29. That motor is secured to the instrument casing through a pad 30.

Normally the motor would rotate considerably faster than the reel on which the film is to be wound should be revolved, and accordingly, reduction gearing is employed. The motor itself is preferably of variable speed type controllable through a rheostat or by other conventional means. The change of speed may be obtained by varying the reduction gearing ratio, for example, by a Transitorque or by some other commercial speed reducer.

The supply reel 19 is rotatably mounted on a spindle 31 which projects through bulkhead 23 and bearing 32. A spring 33 and friction washer 34, adjustable by adjusting nut 35, impose enough drag on the reel to prevent its overrunning.

Each of the reels is maintained on its respective shaft or spindle by a depending stop element 36 or 37, each of these stops being pivoted for swinging upwardly about the end of bracket 38 or 39 for admitting the reel over the end of its respective spindle. Springs 40 and 41 maintain the stop elements in either of their extreme positions.

The film 42 is guided by a pair of flanged rollers 43 and 44. These rollers are freely rotatable on projecting studs 45.

The film is led or guided over a roller 46 which is freely rotatable, preferably on an anti-friction bearing. This roller is mounted at the end of a stud 47 which also projects from the bulkhead 23. The roller 46 must be of a width slightly less than that of the film which is guided over it so that the film will overhang at either side to allow clearance for the contact elements. Of course, the instrument may be designed to accommodate any width of film, but since it is most often used for gauging the width of film for moving picture photography, the actual widths to be accommodated are 8 mm., 16 mm., and 35 mm. As designed here, the instrument may be employed for any one of these three films by substituting a different roller 46, and making other suitable changes.

The measurement is actually taken as the film passes over the roller 46 and it is important that the roller be of a suitable diameter to curve the film sufficiently to strengthen it against deflection due to the slight pressure of the gauge blocks bearing at either side. This curvature is termed a longitudinal one. If the film were to be led past the gauging blocks in a flat plane, deflection or distortion of film would make it impossible to take any reliable reading. Curving the film at that particular point gives to it during its continuous passage through the instrument, a temporary deflection along its length which increases very materially its resistance to laterally directed compressive stress so that a true reading may be taken.

The actual measurement is taken at the vertical center line of the film curving or deflecting zone and the film contact elements may both be movable or one may be fixed and the other movable. In the form of the invention first described one element 48 is relatively fixed and is supported at the end of a post 49 which extends into the bulkhead 23 and is held in place by a locking screw 50 having a cone point engageable within notches at the top of the post said point and notches not being shown since they are known per se. These notches are so positioned as to allow three settings of the block 48, one for each of the above mentioned widths of film.

A bracket 51 is fixed at the base of the casing and supports a pair of horizontally disposed members 52 and 53 in which is a pivot 54 for a vertically extending arm 55 carrying at its upper end the second one 56 of the pair of film contacting elements. These elements 48 and 56 are of hard, wear resistant material such as Carboloy, sapphire, agate or chromium plated steel. They are preferably removable so as to be replaced when they show the effect of cutting or grooving. The pivot 54 allows movement of the arm and block 56 with as little friction as practicable. The lower end of the arm has fixed thereto a movable condenser element 57. Condenser element 58 is carried by a threaded screw 59 extending into bulkhead 23 and providing an adjustment for the condenser. A lock nut (not shown) maintains it in adjusted position. The condenser element 57 connects through to the electric circuit, later to be described, by means of a suitable conductor 60 of very fine, flexible wire extending upwardly through a central conduit 61 and out at the pivot 54. The wire 60 connects to a metallic conductor 60' extending through a shielding tube 62 of polystyrene resin or other suitable material. Of course, plate 58 is grounded.

Figure 4:
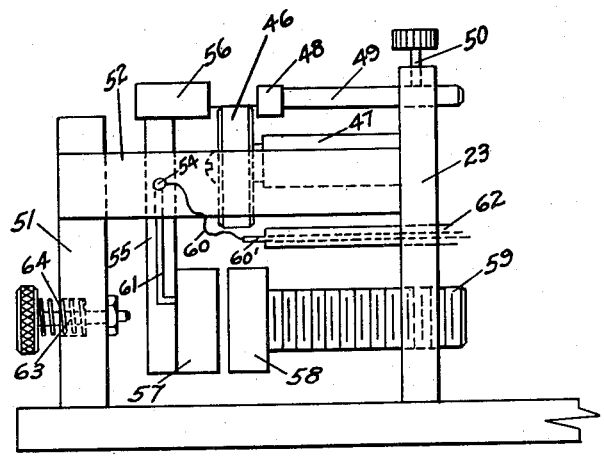
Fig. 4 is a section taken through the center line of the measuring portion of the instrument.

In practice, an initial or zero setting must be made, and for that purpose, a gauge block may be used, said block being inserted between the film contacting elements 48 and 56, or a spring plunger 63 especially provided for the purpose may be employed. This plunger 63 is normally maintained in the position shown in Fig. 4 by spring 64. The length of the plunger is just sufficient for contacting arm 55 and moving it to the so-called zero position when the plunger is pushed inwardly to its greatest extent. The weight of the condenser 57, block 56, and attached parts is such that, along with the strategic position of the pivot point 54, the film contacting element or block 56 always tends to move inwardly against the film with a predetermined, substantially uniform pressure. For practical purposes that pressure is about one and one-half ounces although the actual amount may vary for different applications. Of course, instead of relying upon the weight of the movable elements, they may be balanced and a spring employed for obtaining the requisite pressure of the measuring block at the edge of the film. The thicker the film or the more natural resistance to flexing it possesses, the greater the pressure that may be exerted against it.

When it is desired to measure film of different width, the post 49 is moved in or out and is locked in the appropriate position by the engagement of locking screw 50 with one of the notches. The roller 46 must be removed and replaced by another of appropriate width for the particular film. Of course, the film will be wound upon a reel of proper width and a corresponding take-up reel must be used. The guiding rollers 43 and 44 are quickly detachable and may be replaced by others. The elements just described as being changeable are to be furnished with each machine; they are made in sets for accommodating 8 mm., 16 mm. and 35 mm. film.

The sensitivity of the instrument is largely governed by the electronic circuit depending upon the particular design and characteristics thereof. A certain amount of variation in sensitivity may be obtained by proportioning the arm 55 so that the lower or depending portion thereof bears a greater ratio to the length of the part extending upwardly. The greater the ratio, the more sensitive the instrument, or the finer the measurements which may be taken.

Figure 5:
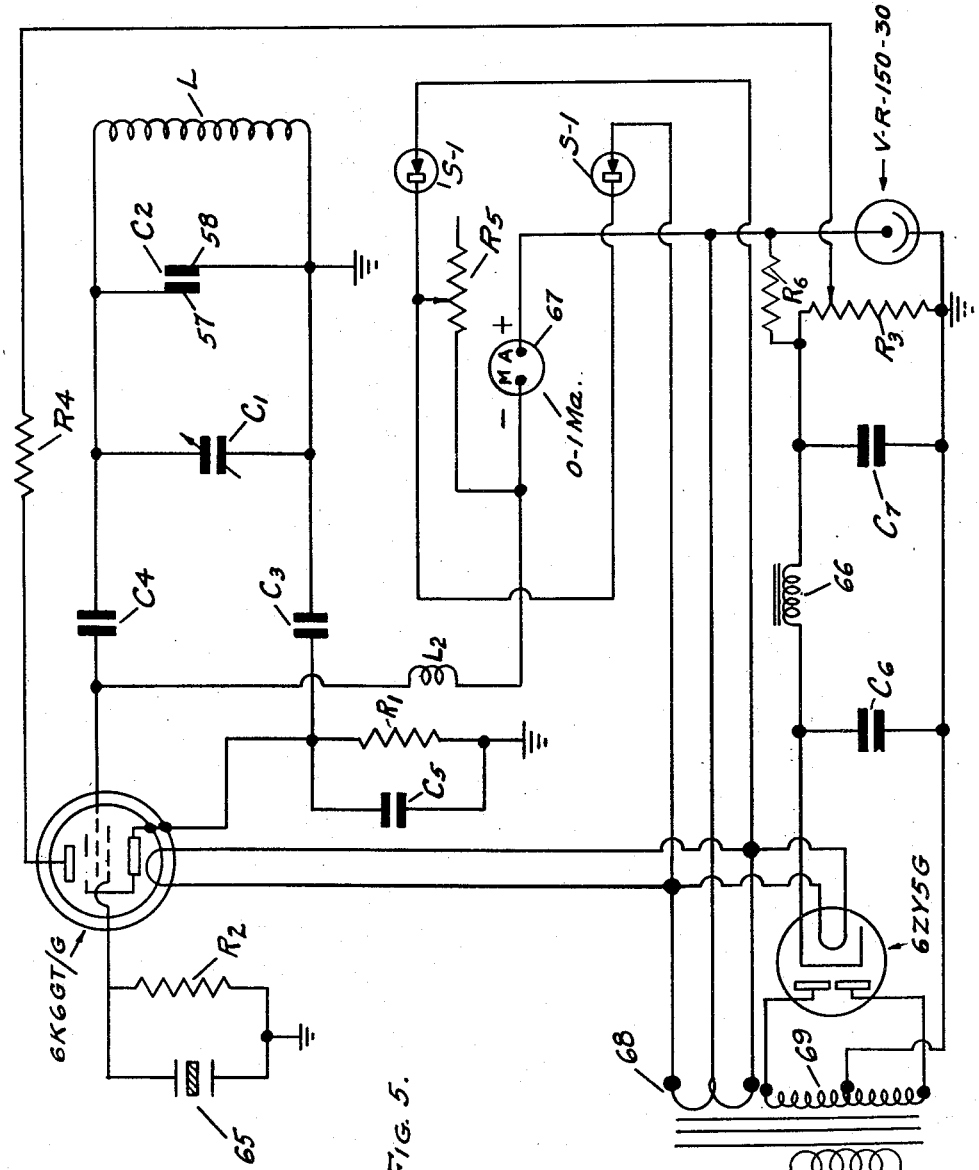
Fig. 5 is a diagram of one form of electronic amplifying circuit which may be used.

Having now described the mechanical construction of one embodiment of the invention, a general description will be given of the characteristics of the oscillator circuit. The condenser, the capacitance of which varies in accordance with change in width of a film being measured, is connected to an oscillatory circuit such as a parallel resonant circuit as shown in Fig. 5. This resonant circuit is connected to the screen grid of a vacuum tube, and acts as a load on the tube in the nature of a variable, tunable resonant circuit.

The vacuum tube oscillator comprises a fixed frequency source in the form of a piezo-electric crystal 65 connected in the input circuit of the tube between the control grid and the cathode. A grid load resistance $R_2$ provides a direct-current path for the grid circuit and a cathode resistance $R_1$ suitably by-passed by the condenser $C_5$ takes care of the operating bias voltage requirement.

The tunable resonant circuit connects to the screen grid electrode of the tube for reasons of more suitable trans-conductance and greater stability, and consists of an inductance L and tuning condenser $C_1$ in parallel therewith. In shunt with this condenser is also the capacity $C_2$ which, in effect, is formed by the aforementioned plates 57 and 58 and is varied by the film gauging means. The oscillatory circuit is connected between the screen grid and cathode by means of coupling condensers $C_3$ and $C_4$.

Operating voltages for the vacuum tube are derived from a conventional rectifier power supply including a rectifier tube having the anodes connected to the high voltage secondary winding 69 of the power transformer. The rectifier output voltage between cathode and the center tap of the secondary winding 69 is filtered by the choke 66 and condensers $C_6$ and $C_7$, and is applied to the potentiometer $R_3$, the rider of which connects to the anode load resistance $R_4$ of the tube. A regulated supply for the screen grid voltage is provided by the voltage regulator tube VR–150, the cathode of which connects to the grounded negative terminal of the supply and the anode to the positive terminal thereof through a suitable series resistance $R_6$. The regulated voltage is applied to the screen grid of the tube through a radio frequency choke coil $L_2$, which is in series also with the indicating milliammeter 67.

In order to balance the normal screen grid current, and thereby utilize the full scale of the meter 67, an auxiliary direct-current source is established in shunt with the meter. This comprises the filament winding 68 of the power transformer, the center tap of which connects to the voltage regulated supply terminal of the screen grid electrode and two dry disc rectifiers $S_1$ are placed in series between the terminals of the filament winding 68, respectively, being joined to the rider of the variable resistance $R_5$, which connects to the negative terminal of the meter 67. The rectifiers are so polarized as to cause a current flow in the meter which is in opposition to the current in the screen grid circuit of the oscillator tube under certain operating conditions.

The operation of the oscillator for indicating capacity changes is based on the effective loading of a tuned circuit, e. g., the variation of impedance offered by the circuit when at resonance, and when off resonance. The circuit of L and $C_1$ adjusted to resonance at the frequency of the crystal oscillator will offer a high impedance, whereas when de-tuned to a frequency different from the resonant frequency or crystal frequency, the impedance will be lowered. The screen grid current indicated by the milliammeter is related to the circuit impedance. The value of this current, characteristic to operation when the circuit is at resonance with the crystal oscillator, is cancelled by the current produced by the rectifiers $S_1$, so that normal resonance screen grid current is not indicated. This cancelling effect can be adjusted by the resistor $R_5$ so that indication may be starting at zero or at some other point on the meter.

The effective capacity of $C_2$ between plates 57 and 58 is set for normal film widths and is taken into consideration when the oscillator circuit is tuned to resonance by the condenser $C_1$. Therefore, the change in the effective capacity of $C_2$ produced by variations in film width de-tunes this circuit, resulting in a change of screen grid current indicated by the meter 67. The latter, as stated before, may be calibrated to indicate such current change directly in terms of width of the film. A milliammeter graduated in fractions of a millimeter is most satisfactory in routine production work; however, for other purposes, it may be found more desirable to employ a sensitive galvanometer by means of which more accurate measurements may be taken. If in the measuring of the film the operator of the device is not to be in constant attendance, or if a permanent record of the width measurements for the length of film is desired, a recording instrument may be substituted for the milliammeter. Such recording instrument may operate according to any of the known schemes, and in place of the milliammeter, or in conjunction therewith, the recording instrument is to be incorporated in the device. One example of such instrument is the well known Esterline-Angus recording milliammeter.

Now referring to Figs. 6–13, a modification will be described in which the mechanical details have been differently constructed while the electrical part of the apparatus is preferably the same as that above described. The action of the film contact elements or gauging elements is confined to a straight line movement rather than being of a swinging or pivoted construction. It is also preferred that both film contacting elements be movable, and consequently, both of the condenser plates are movable. This modification is so designed and constructed that with very few changes the machine can be converted from one size of film or strip material to another. The design is primarily adapted to production of machines using standardized and identical parts for different sizes or widths of film, a minimum of the parts entering into the make-up of the machine being especially constructed for the width of material to be accommodated.

A casing similar to that previously described is employed for housing the unit and instead of bulkhead 23, a bracket 70 is attachable to the base of the casing and that bracket supports a second bracket 71 extending rearwardly to mount a driving motor similar to that above described. That driving motor, part of which is illustrated at 72, has a clutch generally indicated by numeral 73 by which it drives spindle 74 rotatable on anti-friction bearings 75 housed in the sleeve 76. The spindle 74 is reduced in size at its outer end 77 and carries a key for driving a drum 78 on which the film or strip material is to be wound. A latch 79 may be snapped from one position to another for securing the drum or reel on the spindle and for allowing quick removal thereof.

At the opposite side of the machine a second spindle 80 is freely rotatable on bearings 81 similarly housed in a sleeve 82, and has a reduced drum or reel mounting end 83 and latch 84. This spindle carries a sheave 85 about which a brake band 86 is pressed, said band carrying the usual friction material and being adjustable as to the amount of drag imposed upon the supply reel by an adjusting screw 87 and thumb nut 88. The band 86 attaches at its lower end to a stud or post 89 while the adjusting screw 87 passes through a plate or extending bracket 90 against which the thumb nut 88 bears. Of course, the supply reel indicated by numeral 91 is similar to the take-up reel 78.

Figure 6:
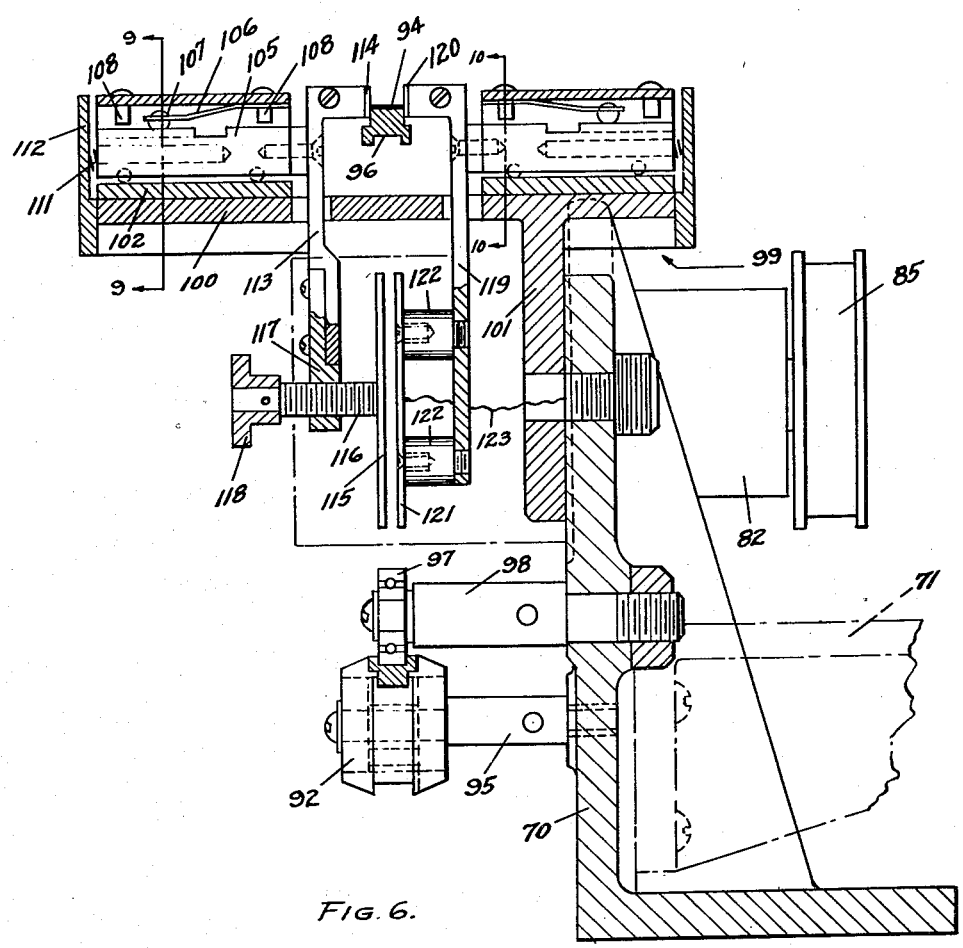
Fig. 6 is a sectional view of the handling parts of a modified form of the instrument.
Figure 8:
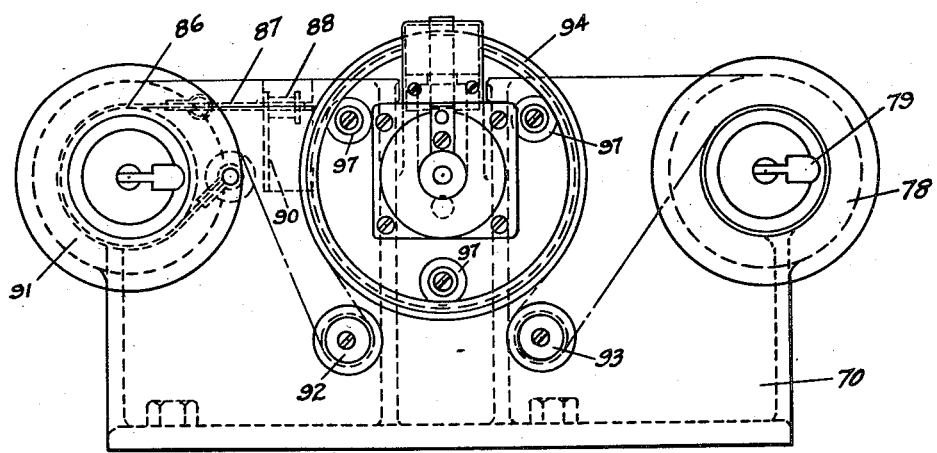
Fig. 8 is a front elevation of the mechanism shown in Figs. 6 and 7.

As shown in Figs. 6 and 8, the film is guided by means of flanged rollers 92 and 93 and between these rollers, passes over a wheel 94 which, in this form of the invention, performs the same function as the roll 46 in the form of the invention previously described. The guide rollers 92 and 93 are rotatable on projecting studs 95 extending outwardly from the bracket 70. The wheel 94 has a film engaging periphery which must be of slightly less width than the material to be gauged, at least at its outermost part, that is, the part which projects or rotates past or between the film contacting or engaging elements. This wheel is internally grooved as at 96 and is supported and freely rotatable on three or more anti-friction bearings 97. These are preferably ball bearings, but may be any other suitable type of anti-friction bearing, or in fact, may be plain rollers in certain instances. Anti-friction bearings are more or less generally used throughout these instruments for reducing the friction, lessening the strain on the film or other material, and rendering the action more smooth than would otherwise be the case. However, they are not entirely essential and plain bearings may be employed, especially in cheaper constructions. The bearings 97 are mounted at the end of a corresponding number of studs 98 projecting outwardly from the bracket 70. Of course, the center lines of the bearings 97, wheel 94, guide rollers 92 and the take up and supply reels are all maintained within a single vertical plane.

Figures 9, 10:
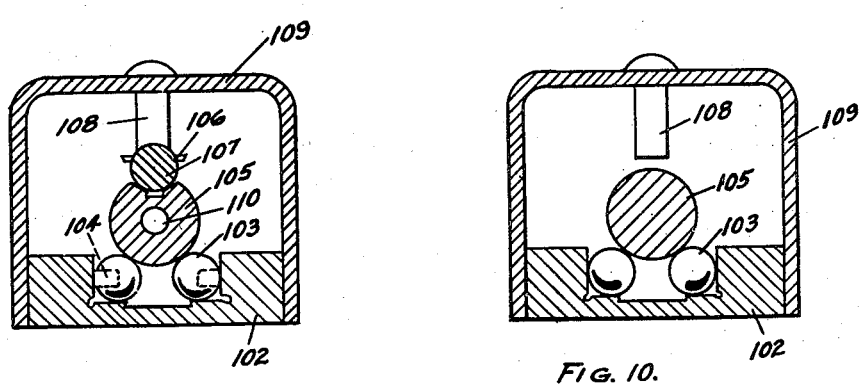
Fig. 9 is a section taken along the line 9—9, in Fig. 6.
Fig. 10 is a section taken along the line 10—10, in Fig. 6.

The film contacting or engaging elements are carried by a bracket generally indicated by numeral 99 which has a horizontal part 100 and a vertical portion 101 the latter being connected or bolted to bracket 70. As illustrated in Figs. 9 and 10, the bracket 100 carries a plate 102 which is centrally channeled for supporting steel balls 103, four such balls being carried by the plate 102 and being retained in spaced relationship and adjacent the ends of the plate by pins 104. These pins allow each of the balls to roll throughout a short distance, but do maintain them at a position very close to the ends of the channel in the plate so that they offer a firm support for the extension 105. This extension is maintained in position by a spring 106 which carries a ball 107 engageable within a V-shaped slot at the upper side of the extension. To prevent excessive movement of the extension in the event of some unforeseen or unusual action of the mechanism, two pins 108 extend through a U-shaped or channel housing 109 attached at its lower edges or sides to the plate 102. These pins extend very close to the extension 105 but normally do not touch it. The extension is drilled out at 110 and carries a coil spring 111 engageable against end plate 112, this spring being of sufficient strength to push the film contacting or engaging mechanism inwardly against the edge of the film with sufficient force to mainain that contact but not enough to distort the passing film which is strengthened against laterally directed compression since it is passing over the curved wheel 94 at that time.

The extension 105 carries at its inner end a holder 113 which, at its upper end, supports a removable contact piece or element 114 preferably of hard, wear resistant material similar to that described with respect to the first form of the invention. At its lower end, the holder 113 carries the condenser plate 115, the construction in the preferred form of the mechanism being as shown in Fig. 6. Therein the plate 115 is fixed at the end of a screw 116 threaded through the attached element 117, although it might be threaded directly through the lower end of the holder 113. A thumb wheel 118 serves to effect adjustments.

At the opposite side of the wheel 94 an identical construction is employed and a description of those parts existing at one side only need be given. The only distinguishing characteristic being that the holder 119 carrying the inner contacting piece 120 does not provide for an adjustable mounting of the condenser plate 121. That plate is supported on insulating spacers 122. The electrical connections from the condenser plates through to the electronic circuit are shown at 123 and are more or less like those mentioned with respect to the form of the invention disclosed above.

The contact elements 114 and 120 are actually set in blocks which clamp in the holders 113 and 119. They are thus quickly removable and may be replaced in the event one of them becomes grooved due to abrasive action of the passing film. The plate or bracket 100 is cut out to allow insertion of the holders 113 and 119, since they extend from above that plate to a position beneath it and carry the condenser elements at their lower ends. The straight line movement makes it desirable that the whole mechanism for carrying the condenser parts and the film engaging elements be as compact and light in weight as practicable. To that end, certain of the parts may be constructed of extremely light metals such as aluminum, aluminum alloys, or magnesium alloys. They should offer as little frictional resistance to movement as possible and should not present any great amount of inertia if the film is to move at a rapid linear rate. The springs 111 are relatively light and exert only that force necessary to maintain the elements against the edge of the passing film.

The construction is such that the condenser, the horizontal part 100 of the bracket, and the lower portions of the condenser supporting elements are mounted within the internal diameter of the wheel 94. That is made possible by the construction of that wheel and its bearings.

Figure 7:
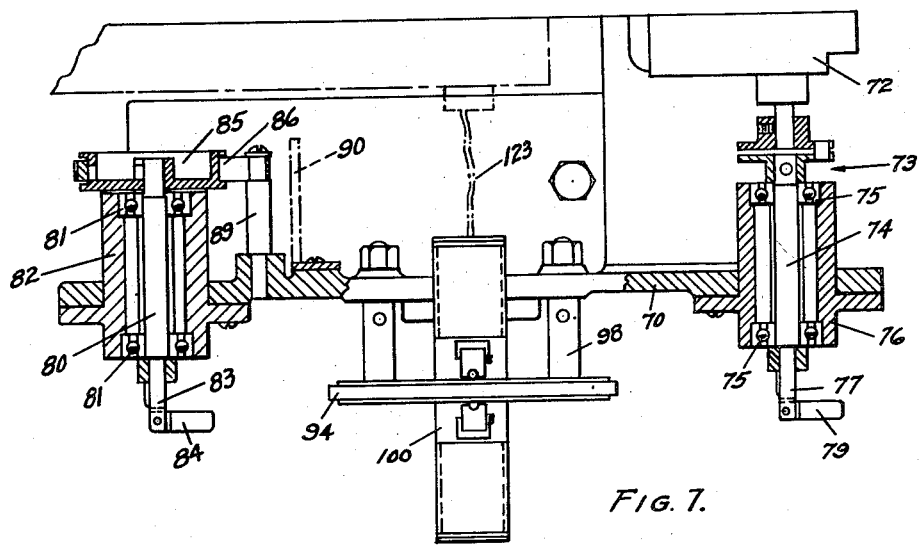
Fig. 7 is a horizontal section through part of the modified form.
Figure 11:
Figs. 11, 12 and 13 are sections through a fragment of different sizes of film or strip guiding wheels.
Figure 12:
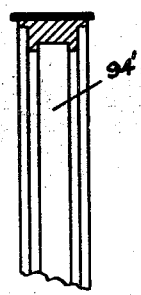
Figure 13:
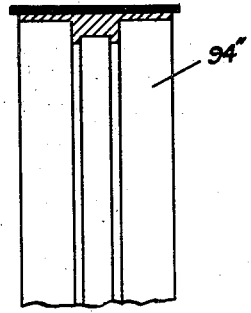

In the event 8 mm. film is to be handled, the wheel 94, a section of which is shown in detail in Fig. 11, is employed, and other elements used therewith take the particular form shown in Figs. 6, 7 and 8. Figs. 12 and 13 show the film guiding wheels 94' and 94'' for use with 16 mm. and 35 mm. film, respectively. The groove at the inner diameter of each of these is adapted to engage and be supported upon bearings 97. Thus these wheels are quickly interchangeable on the machine, or if manufacture is to be based on building up three separate machines from as few stock parts as possible, it is greatly facilitated by the features of construction just described and to be described with respect to other cooperating elements.

The guide rollers 92 are also made in three different sizes, any one of them being adapted to fit the studs 95 and to function centrally with respect to the center plane of the wheel 94.

The holders 113 and 119 are made in three different shapes, the distinguishing characteristic thereof being in the curvature of the lower extension whereby the condenser parts may be maintained in proper position, also the contact elements properly spaced for 16 or 35 mm. film, the only other variable being the length of the horizontal portions of bracket 99. That bracket is machined in three different sizes for accommodating the three differently shaped holders 113 and 119.

If it is desirable to maintain the length of bracket 99 the same for all machines and to use only one type and shape of holder, then the upper end of those holders may be modified so as to retain the contact elements 114, 120 and their retaining blocks in properly spaced relationship for either 8 mm., 16 mm. or 35 mm. film. That may be accomplished by making three different types of contact element retaining blocks, or having one type adjustably held in the holders.

While the film or strip material has been described as being supplied on a reel or drum and being taken up on a similar instrument, that is not entirely essential, as other schemes may be employed, for example, film may be measured at some stage in its production or at determination of manufacturing processes thereon, in which event the machine may be employed at some intermediate position between other machines or between a machine from which the film is drawn, after which it may be wound on some suitable instrumentality.

The electronic circuit may be varied in certain details so long as the general principles of the invention apply. This disclosure is intended to include or to suggest all modifications which might naturally result therefrom and which naturally fall within the spirit of the inventive concept.

Operation

Assuming the machine has been set up for measuring the particular width of film to be handled the switch is turned to the position marked "Tune" and the power switch turned on. At that position it requires about five minutes for the circuit to warm up during which time no film is inserted between the measuring elements, although a supply of film is mounted in the machine and the take-up reel may be in position on the take-up drive shaft.

The adjustable side of the condenser may have to be adjusted and the instrument should be tested for an initial reading. That is done by turning the condenser plate adjusting and supporting screw until the pointer on the milliammeter comes to rest at an index mark which depends upon the width of the film to be handled.

After the preliminary setting has been made, the switch should be snapped to the position marked "Operate" and a so-called zero adjustment made. That is accomplished by using the zero setting plunger 63, Fig. 4, or by using a gauge block especially provided for the purpose. Of course, if a gauge block is used, it is inserted between the film contact elements at the same position the film itself would occupy if threaded through the machine. Any adjustment needed is made so that the instrument will read zero when the gauge block is in position, or alternatively, when the zero setting plunger is pushed in to its fullest extent.

To thread the film through the machine, the switch is moved back to the "Tune" position, whereupon the film may be threaded through the machine and attached to the take up reel after which the switch should be snapped back to the position marked "Operate." The motor speed control should be set at the desired point whereupon the take-up drive may be started and the width variations read by an operator in attendance, or if the machine is of recording type, a record will be produced which may accompany the film or which may be filed with appropriate reference to the film to which it applies, or other use thereof made.

The invention is defined in the appended claims.

We claim:

1. In a machine for measuring the width of moving, flexible strip material, the combination of means including an element with a curved surface over which said material is passed and guide means for causing it to conform to the curved surface for a substantial arc, said surface being of sufficient curvature to flex the material longitudinally to impart to it resistance against lateral compressive forces, and gauging means, one at each side of the curved surface, positioned to bear against the edges of the strip material at a point at which it is in its curved state as it passes over said curved surface.

2. In a machine for measuring the width of moving, flexible strip material, the combination of means including a roller having a width slightly less than the width of material to be measured and of such curvature that said material in passing over said roller is longitudinally flexed to impart to it strength against lateral compression, guide means for causing said material to conform to the surface of the roller for a substantial arc, and gauging means at each side of said roller for contacting the edges of the passing strip material at a point at which it is in a longitudinally flexed state, and means to confine the movement of said gauging means to a single plane only.

3. In a machine for measuring the width of moving, flexible strip material having a gauging head and an indicating means operable by the gauging head, the improvement which comprises a curved surface over which said strip is passed, guide means for maintaining the strip in contact with the curved surface for an extent such that the resulting curvature imparted to the moving strip greatly increases its resistance to laterally directed, compressive stress, a gauging means at each side of said curved surface and means on which said gauging means may move to and from the strip to bear against the lateral edges of the strip at a point at which it is curved about the said curved surface, and a condenser varied by the gauging means in accordance with changes in strip width and connected in circuit with the indicating means.

4. In a machine for measuring the width of moving, flexible strip material having a gauging head and an indicating means operable by the gauging head, the improvement which comprises a roller of relatively small diameter over which said strip is passed, guide means adjacent said roller for maintaining the strip in contact with the roller for an extent thereof such that the curvature imparted thereby to the moving strip greatly increases its resistance to laterally directed, compressive stress, a gauging means at each side of said roller and means on which said gauging means may move to and from the strip to contact the lateral edges thereof at a point at which said material is in its flexed state comprising bearing members for restraining the said gauging means in all directions except in a plane transversely of the moving strip, and a variable condenser interconnected with the gauging means having its capacitance varied thereby in accordance with the changes in width of the strip, said condenser forming a part of a circuit including the indicating means.

5. In a machine for measuring the width of moving, flexible strip material having a gauging head and an indicating means operable by the gauging head, the improvement which comprises a roller of relatively small diameter over which said strip is passed, guide rollers adjacent said first mentioned roller for maintaining the strip in contact with the roller for an extent thereof such that the curvature imparted thereby to the moving strip greatly increases its resistance to laterally directed compressive stress, gauging means at each side of said roller comprising members movable laterally of the strip, means on said members for contacting the edge of the strip at a point where it is in its curved state, and a condenser, one part of said condenser being carried by one member and the other part of said condenser being carried by the other member, projections from said members and guide means within which said projections are movable to and from the strip, said guide means being so constructed as to confine movement of the members to a plane transverse to the strip as it is passed over the first mentioned roller.

6. In a machine for measuring the width of moving, flexible strip material having a gauging head and an indicating means operable by the gauging head, the improvement which comprises a roller of relatively small diameter over which said strip is passed, guide rollers adjacent said first mentioned roller for maintaining the strip in contact with the roller for an extent thereof such that the curvature imparted thereby to the moving strip greatly increases its resistance to laterally directed compressive stress, gauging means at each side of said roller comprising a member at each side of said roller, contact means carried by each member and adapted to bear against the edge of the said strip at a point where it is in its longitudinally flexed state, a condenser one part of which is carried by one member and the other part of which is carried by the opposed member, and means for supporting said gauging means comprising projections from each member and guide means for said projections, said projections being mounted on anti-friction bearings within the guide means and having interengagement with the guide means to prevent relative movement other than in a direction transversely of the strip as it is passed over the first mentioned roller.

SAMUEL C. CORONITI.
WILLY A. SCHMIDT.
HAROLD S. BALDWIN.

REFERENCES CITED

The following references are of record in the file of this patent:

UNITED STATES PATENTS

| Number | Name | Date |
| --- | --- | --- |
| 1,219,345 | Newell | Mar. 13, 1917 |
| 1,559,824 | Wilson | Nov. 3, 1925 |
| 1,750,396 | Evans et al. | Mar. 11, 1930 |
| 1,946,924 | Allen et al. | Feb. 13, 1934 |
| 2,081,738 | Conover | May 25, 1937 |
| 2,083,759 | Temple | June 15, 1937 |
| 2,142,606 | Debrie | Jan. 3, 1939 |
| 2,146,442 | Price | Feb. 7, 1939 |